P. T. B. SMITH.
CLOD-CRUSHER.
No. 178,807.
Patented June 13, 1876.
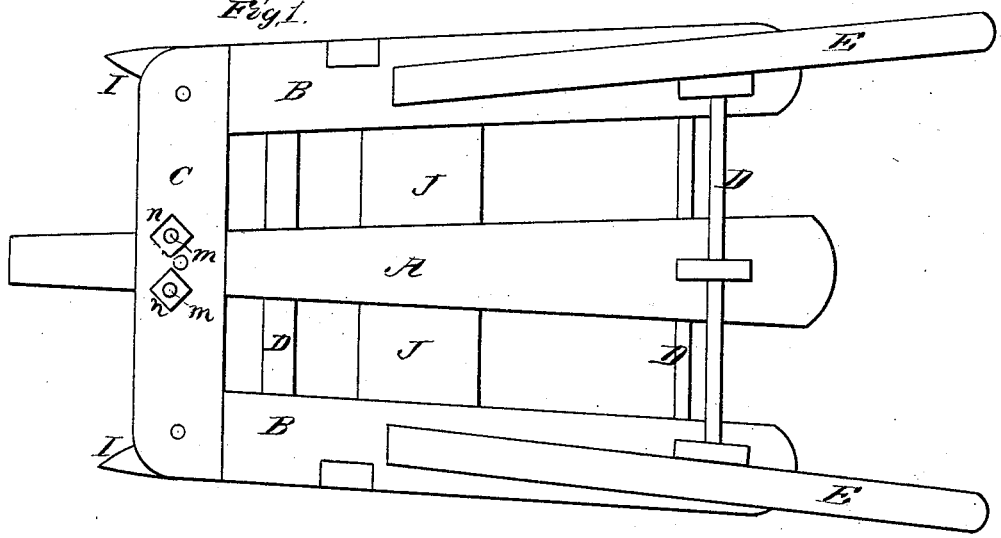
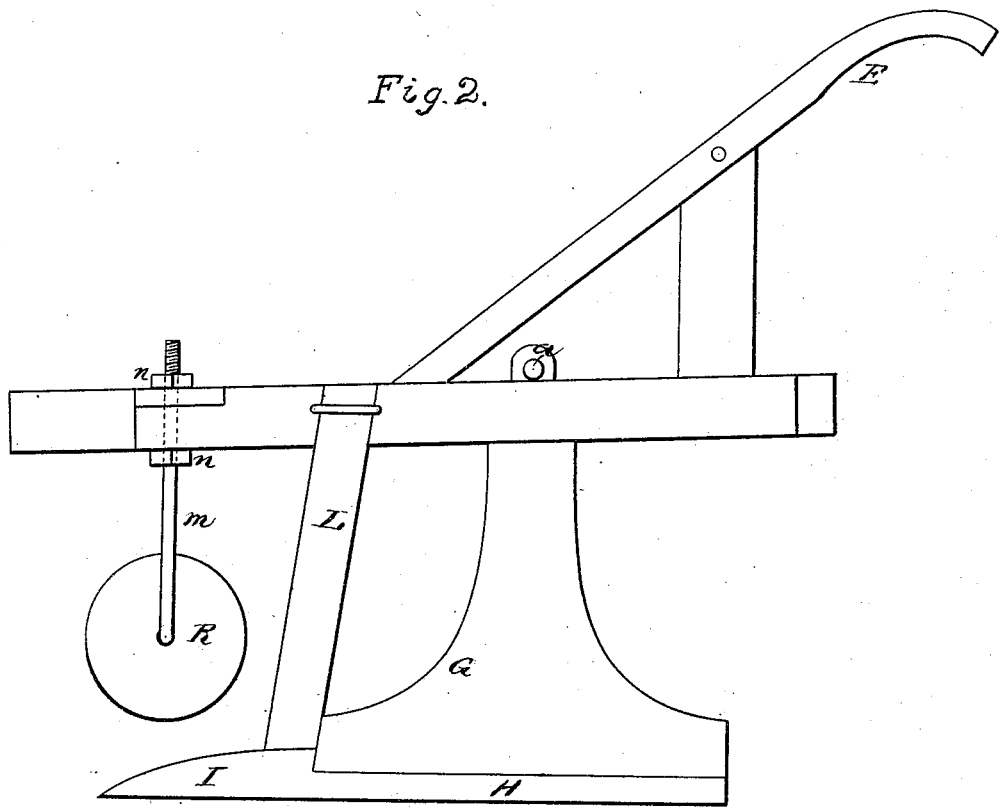

UNITED STATES PATENT OFFICE.

PHILIP T. B. SMITH, OF BELLEFONTE, PENNSYLVANIA.

IMPROVEMENT IN CLOD-CRUSHERS.

Specification forming part of Letters Patent No. 178,807, dated June 13, 1876; application filed May 13, 1875.

*To all whom it may concern:*

Be it known that I, PHILIP T. B. SMITH, of Bellefonte, in the county of Centre and State of Pennsylvania, have invented a new and valuable Improvement in Sod - Cutters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my sod-cutter, and Fig. 2 is a side elevation of the same.

The nature of my invention consists in the construction and arrangement of a sod-cutter, as will be hereinafter more fully set forth.

In the annexed drawings, A represents the center beam, which is to be extended forward and form the tongue. On each side thereof is a side beam, B, the three beams being connected by a front bar, C, and suitable rounds or bars D D, passing through them. E E are the handles attached to the side beams B B. To each side beam B is secured a plow-foot, G, by the upper end of such foot passing up through a mortise in the beam and held by a key, $a$, as shown. The plow-feet G are constructed in the form shown, and each has a land-side bar, H, and share I firmly bolted thereto. Between the plows is a horizontal or center cutter, J, which is slightly inclined upward toward the rear. L L are side cutters, connected to the side beams and the plows.

In operation, the shares I I cut and penetrate the ground on parallel lines, the side cutters L L cutting through the sod on both sides, and the center cutter J cuts it horizontally, and at the same time, by the inclination of said cutter, the sod is detached and lifted from the ground. The thickness of the sod is regulated by means of a wheel, R, suspended at the front of the machine in rods $m\ m$, and said rods adjustable up and down by means of nuts $n\ n$.

What I claim as new, and desire to secure by Letters Patent, is—

The combination of the land-sides H H and shares I I, attached to the plow-feet G G, the side cutters L L, and the inclined center cutter J, as and for the purpose set forth.

In testimony that I claim the above I have hereunto subscribed my name in the presence of two witnesses.

PHILIP TOBIAS BEAUREGARDE SMITH.

Witnesses:
R. C. CHEESMAN,
T. M. LORGWELL.